(12) United States Patent
Desch et al.

(10) Patent No.: US 7,761,092 B2
(45) Date of Patent: Jul. 20, 2010

(54) SYSTEMS AND METHODS FOR COMMUNICATING WITH MULTIPLE DEVICES

(75) Inventors: David A. Desch, Poway, CA (US); Kenichi Kawasaki, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 445 days.

(21) Appl. No.: 10/921,623

(22) Filed: Aug. 18, 2004

(65) Prior Publication Data

US 2005/0176416 A1 Aug. 11, 2005

Related U.S. Application Data

(60) Provisional application No. 60/542,742, filed on Feb. 6, 2004.

(51) Int. Cl.
*H04Q 7/20* (2006.01)
(52) U.S. Cl. .................... 455/422.1; 455/517
(58) Field of Classification Search ............. 455/422.1; 359/172; 375/354, 242
See application file for complete search history.

(56) References Cited

U.S. PATENT DOCUMENTS

| | | | |
|---|---|---|---|
| 6,785,542 B1 | 8/2004 | Blight et al. | |
| 6,822,551 B2 | 11/2004 | Li et al. | |
| 6,853,628 B2 | 2/2005 | Chitrapu | |
| 6,958,984 B2 | 10/2005 | Kotzin | |
| 6,961,541 B2 | 11/2005 | Overy et al. | |
| 2002/0065065 A1 | 5/2002 | Lunsford et al. | |
| 2002/0171898 A1* | 11/2002 | Patton | 359/172 |
| 2003/0027586 A1* | 2/2003 | Johnson et al. | 455/517 |
| 2003/0083013 A1 | 5/2003 | Mowery et al. | |
| 2005/0100102 A1* | 5/2005 | Gazdzinski et al. | 375/242 |
| 2005/0265503 A1* | 12/2005 | Rofheart et al. | 375/354 |

OTHER PUBLICATIONS

International Search Report, Apr. 25, 2006.

* cited by examiner

*Primary Examiner*—Lester Kincaid
*Assistant Examiner*—Phuoc Doan
(74) *Attorney, Agent, or Firm*—Dickstein Shapiro LLP (57) ABSTRACT

Disclosed are systems and methods for communicating with multiple devices. In one embodiment, a plurality of wireless devices in close proximity are able to transmit data at a high rate using a secure connection. While in one embodiment this data is transmitted using a high speed, directional signal at a 60 GHz frequency. In a further embodiment, data is transmitted at a 60 GHz frequency between a personal computing device and a plurality of consumer electronic devices that are in relative close proximity to one another. The directional nature of this high frequency signal permits a large number of devices in a close proximity to communicate without interfering with each other. Moreover, the directional nature of such a high frequency signal provides added communications security since the receiver will typically be in the line of sight of the transmitter.

8 Claims, 7 Drawing Sheets

PRIOR ART

Stand-by

Stand-by

FIG. 3B

1. DC Detection
2. 60 GHz Wakeup

Stand-by

SYSTEMS AND METHODS FOR COMMUNICATING WITH MULTIPLE DEVICES

CROSS REFERENCE TO RELATED APPLICATIONS

This application is related to and claims priority from the U.S. provisional patent application having application No. 60/542,742, filed on Feb. 6, 2004.

FIELD OF THE INVENTION

The invention relates in general to systems and methods for communicating with multiple devices, and in particular to transferring data between multiple devices in close proximity at high carrier frequencies.

BACKGROUND

Recently, there has been a pronounced increase in the types of communication applications that require the use of wireless data transfer. Such applications include, for example, video conferencing, video-on-demand, high speed Internet access, high speed local area networks, online gaming, and high definition television. In the home or office, for example, computing devices continue to be connected using wireless networking systems. Many additional types of devices are also being designed with wireless communication in mind. Moreover, there is a need to transfer data at ever increasing rates.

There is also a need for a wireless device capable of high data rate transfers which consumes less power. In particular, mobile computing devices often have limited power supplies and require more efficient signal propagation designs to maximize the use of such a device's power supply. One way to increase the rate of data transfer is to use multiple transmit and receive antennas while transmitting different data streams on these different antenna simultaneously. However, this approach consumes more power and requires more complex circuitry.

Thus, there exists a need for a system and method for transmitting data at a high rate in an environment where potentially many devices in close proximity are in communication with one another. Thus, what is needed is an cost-effective technique that overcomes one or more of the aforementioned problems.

BRIEF SUMMARY OF THE INVENTION

Disclosed and claimed herein are systems and methods for communicating with multiple devices. In one embodiment, a method includes locating a plurality of wireless devices in proximity to each other, where each the plurality of wireless devices operate at substantially the same frequency. The method also includes transmitting a radio frequency (RF) signal to one of the plurality of wireless devices along a line-of-sight, and receiving the RF signal along the same line-of-sight. In one embodiment, the RF signal is a substantially directional point-to-point signal having a frequency on the order of 60 GHz.

Other aspects, features, and techniques of the invention will be apparent to one skilled in the relevant art in view of the following detailed description of the invention.

DETAILED DESCRIPTION OF THE PREFERRED EMBODIMENT

One aspect of the invention is to provide systems and methods which transmit data wirelessly at a high data rate. In one embodiment, a plurality of wireless devices in close proximity are able to transmit data at a high rate using a secure connection. While in one embodiment this data is transmitted using a high speed, directional signal at a 60 GHz frequency, it should be appreciated that the directional signal may be at a higher or lower frequency.

In a further embodiment, data is transmitted at a high frequency between a personal computing device and a plurality of consumer electronic devices that are in relative close proximity to one another. The directional nature of this high frequency signal permits a large number of devices in a close proximity to communicate without interfering with each other. Moreover, the directional nature of such a high frequency signal provides added communications security since the receiver will typically be in the line of sight of the transmitter.

Another aspect of the invention is to use a direct current (DC) detector to lower the required power consumption of an RF receiver. In one embodiment, an RF receiver (or transceiver) is able to conserve power by reducing or eliminating the need to continuously search for incoming signals. This may be accomplished by a receiver operating in a first mode and a second mode, according to one embodiment. In the first mode, the receiver does not have to continuous search for and/or receiver a signal, but rather may switch to the second mode upon detecting a DC voltage change across one or more impedance elements, thereby indicating an incoming signal. In another embodiment, or in the same embodiment, the first mode is a "stand-by" mode which requires less power, and the second mode is an "active" mode, during which the receiver is able to receive an RF signal. In a further embodiment, the directional signal can be encoded with a transmitter identification pattern recognizable only by the intended receiver. Thus, the intended receiver may only switch to the second mode when it detects a particular transmitter signal.

Figure 1A:
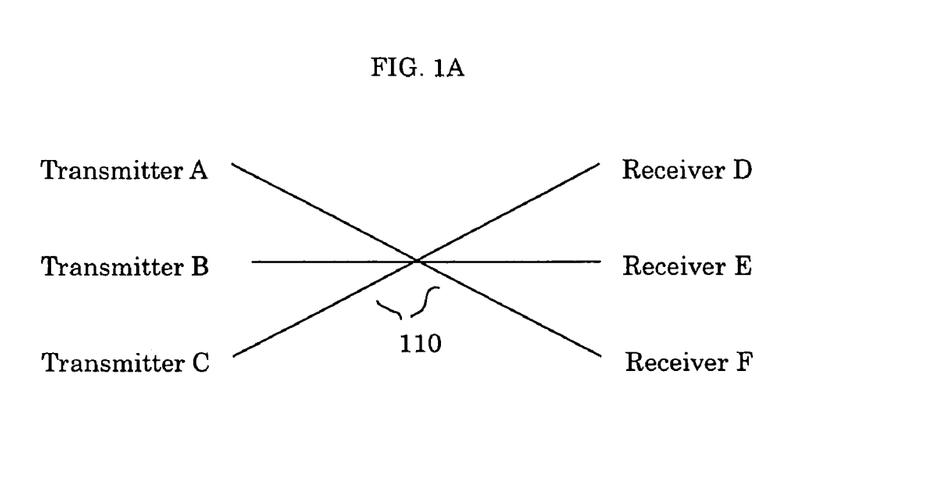
FIG. 1A is a simplified diagram showing the signal spectrums for multiple devices communicating in close proximity, according to one embodiment of the invention.
Figure 1B:
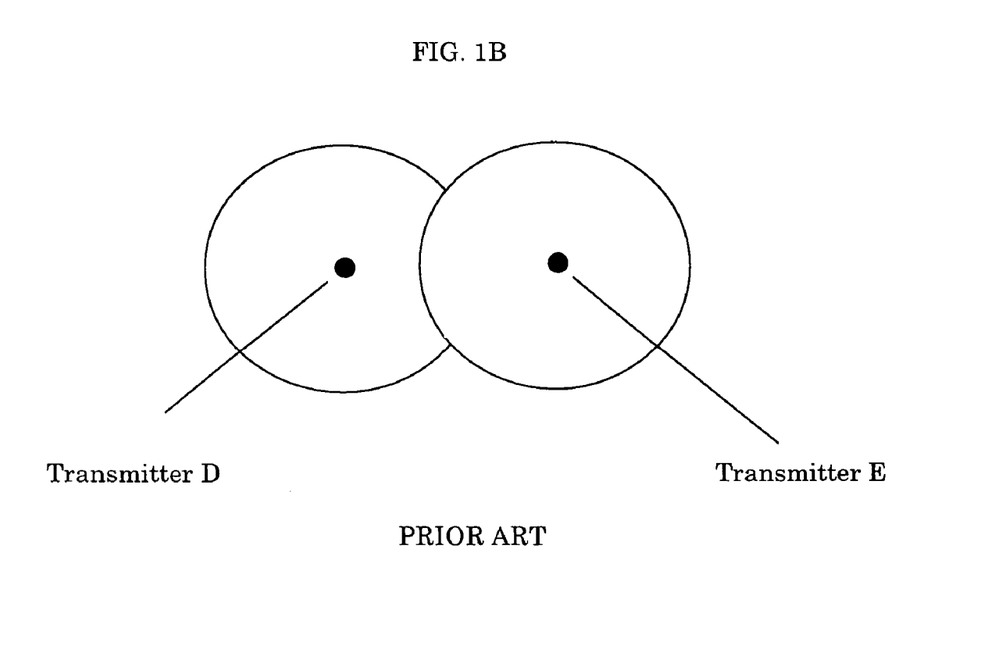
FIG. 1B depicts the signal spectrum of convention transmitters.

Referring to FIG. 1A, depicted one embodiment of a simplified diagram of the paths of directional signals 110 of Transmitters A, B and C while in communication with Receivers D, E and F. In one embodiment, the signals are all RF signals transmitted at 60 GHz, while in another embodiment the RF signals are transmitted at a frequency above 20 GHz. For example, the RF signals may be transmitted at approximately 40 GHz, 122 GHz, 245 GHz, or at any other frequency at or above 20 GHz. It should further be appreciated that the frequency to be used may depend on the propagation loss and/or antenna structure used. With the directional nature of signals 110, Transmitters A, B and C are able to communicate with any combination of Receivers D, E and F without interference from one another. In contrast, FIG. 1B depicts a simplified diagram of conventional Transmitters D and E emitting lower frequency omni-directional signals that overlap and hence interfere with one another.

In one embodiment, directional signals 110 may be achieved using high frequencies, such as on the order of 60 GHz. In addition, spatially orthogonal channels may be achieved with the use of high gain antennas that are accurately aimed. Moreover, the shorter wavelength of higher frequency signals allows smaller antennas to be used. Directional signals reduce interferences, improve communication security, provide better QoS, have a higher bit-rate per area and are more energy efficient.

Figure 2:
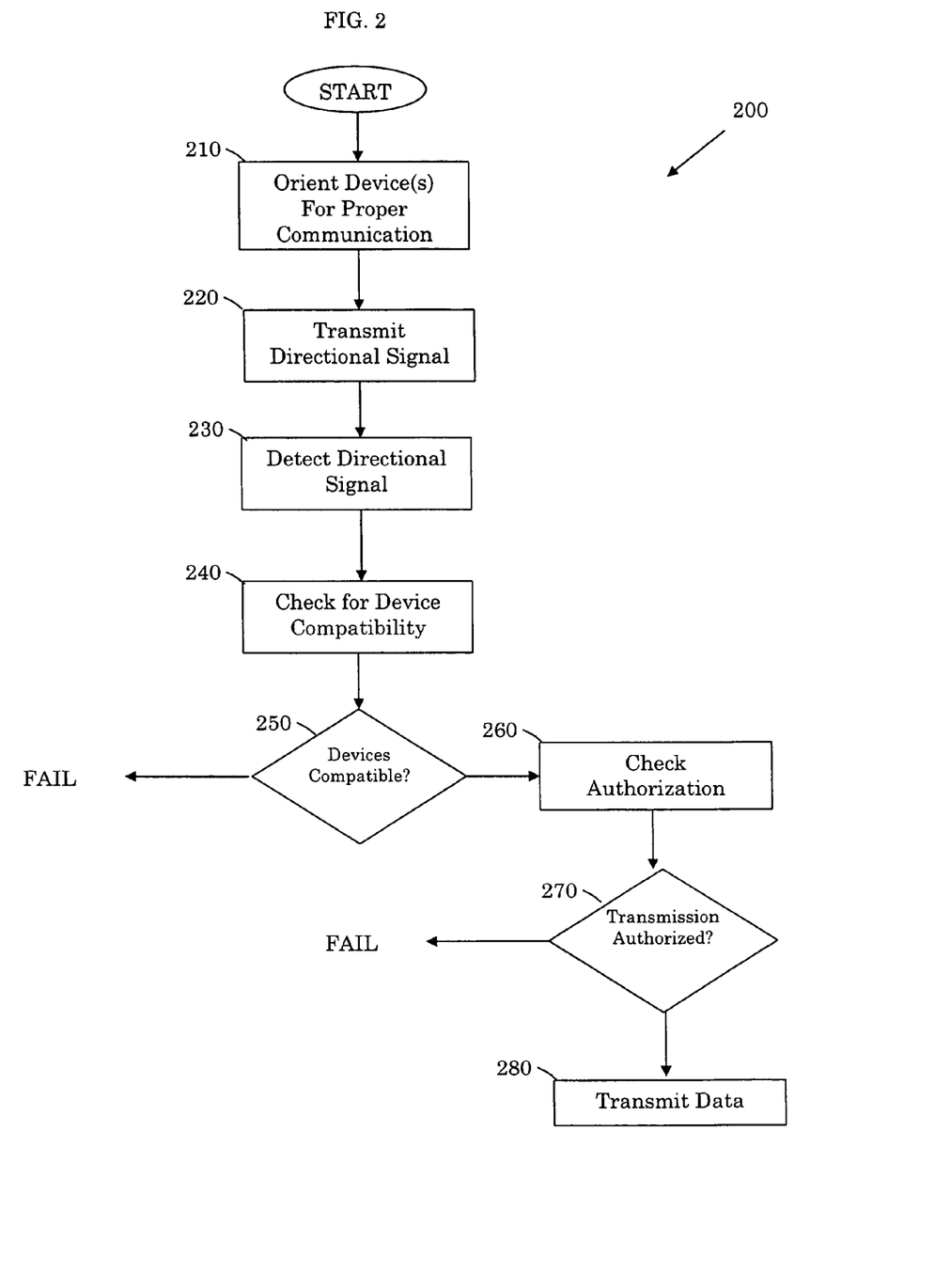
FIG. 2 is a flow diagram illustrating one embodiment of a process for transmitting signals, consistent with the principles of the invention.

FIG. 2 depicts one embodiment of how a plurality of wireless devices in close proximity, such as the devices depicted in FIG. 1, may communicate with each other in accordance with the principles of the invention. In particular, process 200 begins at block 210 with the positioning and/or orientation of the RF devices (e.g., transmitters, receiver and/or transceivers) that are to communicate with each other. This device positioning and/or orientation should take into account the directional nature of the high frequency signals to be transmitted by the RF devices.

Once the desired transmitters, receivers and/or transceivers have been arranged properly, the high frequency signal may then be transmitted at block 220. Assuming the devices were properly arranged, this directional high frequency signal will be detected by its intended recipient device (e.g., receiver, transceiver, etc.) at block 230. Once the transmission is detected, a series of device identification and compatibility "handshaking" may occur at block 240. In one embodiment, this compatibility check may include having a transmitter send out a high frequency signal containing a unique pattern of on/off values. Upon receiving this unique pattern, a corresponding receiver would then be able to consult a database to see if the signal corresponds to a known transmitter. In another embodiment, after receiving a known signal pattern (e.g., particular sequence of on/off values), a receiver/transceiver may be return an acknowledgement signal to the transmitting device. It should further be appreciated that the compatibility check may also include the use of data encryption or similar data security measures.

Thereafter, at block 250, a determination is made as to whether the devices involved in the transmission in question are compatible. In one embodiment, compatibility is determined by checking the frequency of the incoming signal with the frequency at which the receiver operates. If the devices are not compatible, the transmission fails and the process 200 will end. If the devices are compatible, however, then process 200 continues to block 260 where an authorization check is performed.

The authorization check of block 260 is optional depending on the security needs of the given application. It should be appreciated that, when performed, the authorization check may be a simple authentication process or may include more complex forms of authentication. In any event, if it is determined at block 270 that the transmission is authorized, process 200 will continue to block 280 where the data transfer begins. If, on the other hand, the transmission fails the authorization check, then the transmission will fail and process 200 will end.

DC Detection

As mentioned above, another aspect of the invention is to use a direct current (DC) detector, in combination with an RF receiver, to lower the power consumption of the RF receiver. In one embodiment, an RF receiver (or transceiver) conserves power by operating in a "stand-by" mode, during which the receiver circuitry does not have to continuously search for incoming signals. Once a particular signal is detected by the DC detector, however, the RF receiver can be made to switch to an "active" mode, after which it may receive RF signals. This functionality may not be feasible to implement with lower frequency systems since the signals would not be directional and the receivers may have to be continuously operated to detect incoming signals.

Figure 3A:
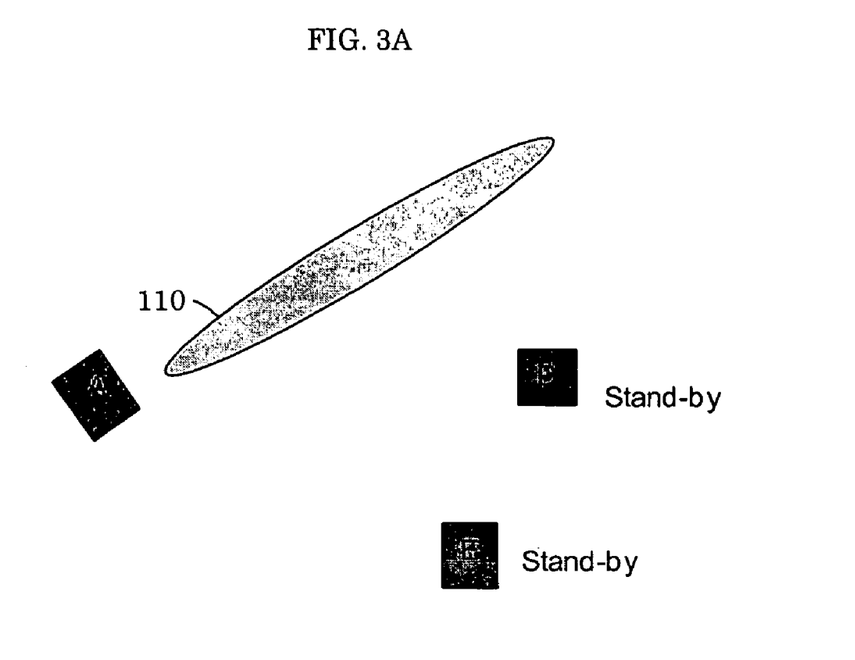
FIGS. 3A-3b are simplified diagrams showing particular embodiments of transmitter/receiver interactions, consistent with the principles of the invention.
Figure 3B:
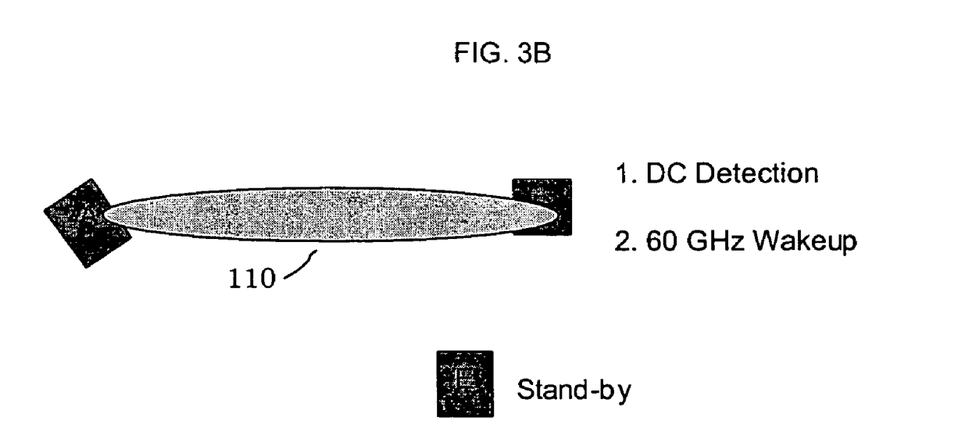

In FIG. 3A, Transmitter A from FIG. 1 is transmitting a high frequency directional signal (e.g., higher than approximately 20 GHz). However, since Receivers D and E are not oriented to be able to detect signal 110 from Transmitter A, Receivers D and E remain in a stand-by mode. As shown in FIG. 3B, the orientation of Transmitter A is shifted such that signal 110 is detectable by Receiver D. When this signal is detected by Receiver D, it can switch from a stand-by mode into an active mode. Receiver E, still being out of range of signal 110, remains in stand-by mode thereby conserving power.

Figure 4:
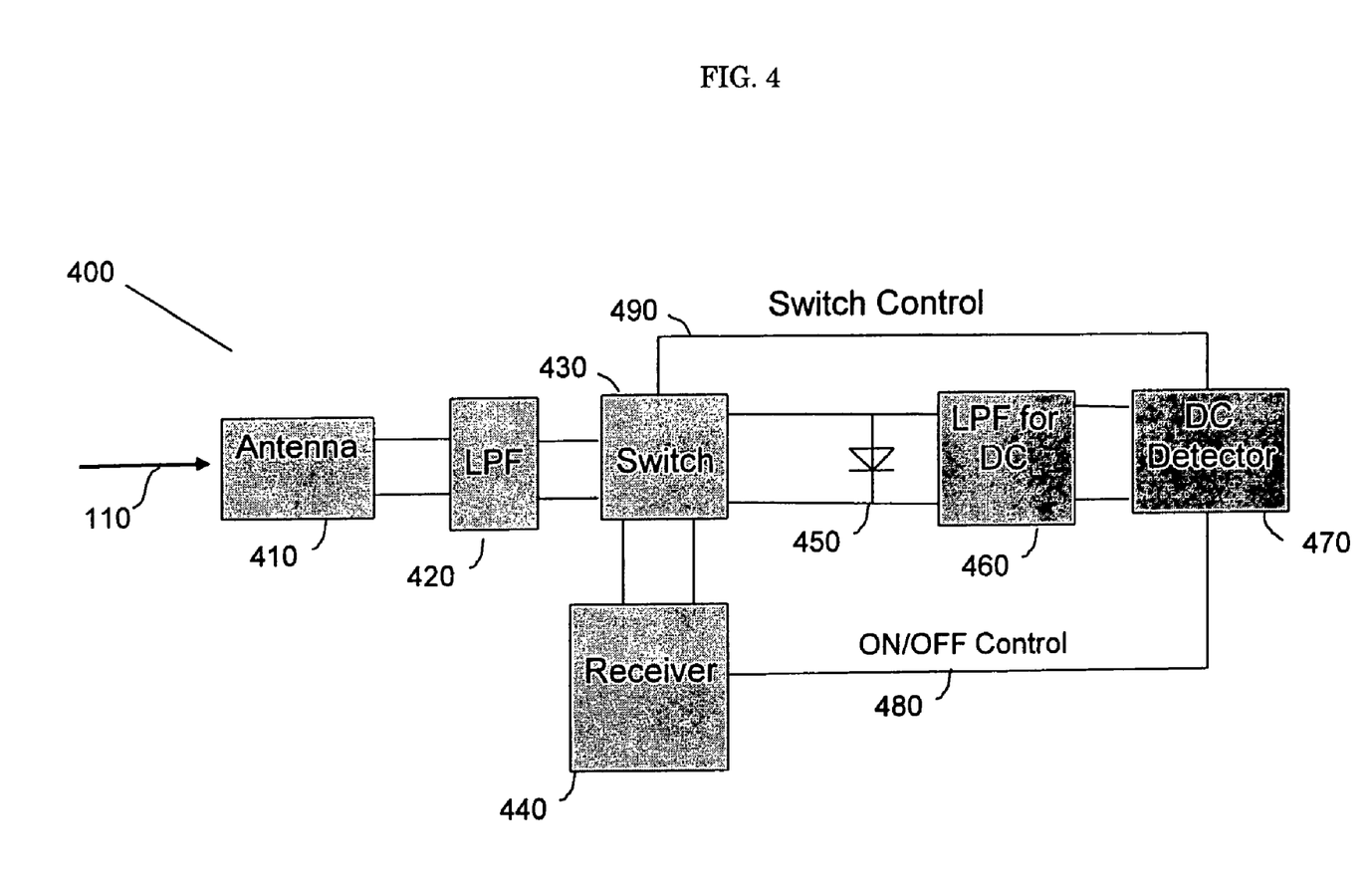
FIG. 4 is a schematic diagram for a receiving circuit, according to one embodiment.

FIG. 4 is one embodiment of a receiving circuit 400 which utilizes DC voltage detection to switch between a low power consumption mode and an active mode. The up/down signal conversion operations of receiver 440 consume a relatively large amount of power. However, these operations need only be performed while the receiver 440 is actively receiving and/or searching for an RF signal. Thus, one aspect of the invention is to reduce the amount of power the receiver 440 consumes by switching to a low power consumption mode during which these up/down signal conversions will not be performed. In one embodiment, the receiver 440 is turned off when it enters the low power consumption mode. In one embodiment, the up/down conversion is performed with a non-linear device (e.g., a diode, transistor, etc.) and a local oscillator. Generation of a high frequency local oscillation is not as efficient as a low frequency local oscillation. Thus, power consumption can be reduced by reducing or removing the need to produce a high frequency local oscillation. Moreover, high speed communication typically requires a wider bandwidth.

Continuing to refer to FIG. 4, receiving circuit 400 may receive RF signal 110 using antenna 410. In one embodiment, the RF signal 110 is a high frequency signal (e.g., higher than 20 GHz), while the antenna is a directional antenna. The incoming signal 110 may pass through a low pass filter (LPF) 420, which in one embodiment may alternately be integrated with antenna 410.

The antenna 410 may have high pass filter (HPF) characteristics to account for the high frequency signal to be received (e.g., 60 GHz). However, if the antenna 410 does not have HPF characteristics, then LPF 420 may be replaced with a band pass filter, according to one embodiment. In another embodiment, or in addition to one or more of the previous embodiments, a low noise amplifier (not shown) can be used with the antenna 410.

As depicted in the embodiment of FIG. 4, switch circuit 430 is a multi-port circuit coupled to the antenna (via the LPF 420), a receiver 440 and a DC voltage detector 470. When the receiver 440 is in the low power consumption mode, the switch circuit 430 may pass the incoming signal 110 on to the DC detector 470, as shown in FIG. 4, instead of passing it to the receiver 440. However, before the signal is provided to the DC detector, the signal may be rectified using rectifying circuit 450 which, in one embodiment is a diode-type circuit. However, it should be appreciated that any rectifier may similarly be used. A second LPF 460 may also be used to reduce signal harmonics effects prior to the DC detector 470.

If a valid signal is detected, which in one embodiment is a 60 GHz signal, the DC detector 470 may emit switch control signal 490 to cause the incoming signal 110 to pass to the receiver 440 rather than through to the DC detector 480. Either before sending the switch control signal 490, or simultaneously therewith, the DC detector 470 may provide an ON/OFF control signal 480 to the receiver 440 to switch it from the low power consumption mode into an active mode so that it can begin receive the incoming signal 110. Thereafter, the switching circuit 430 will direct the incoming signal 110 to the receiver 440.

Figure 5:
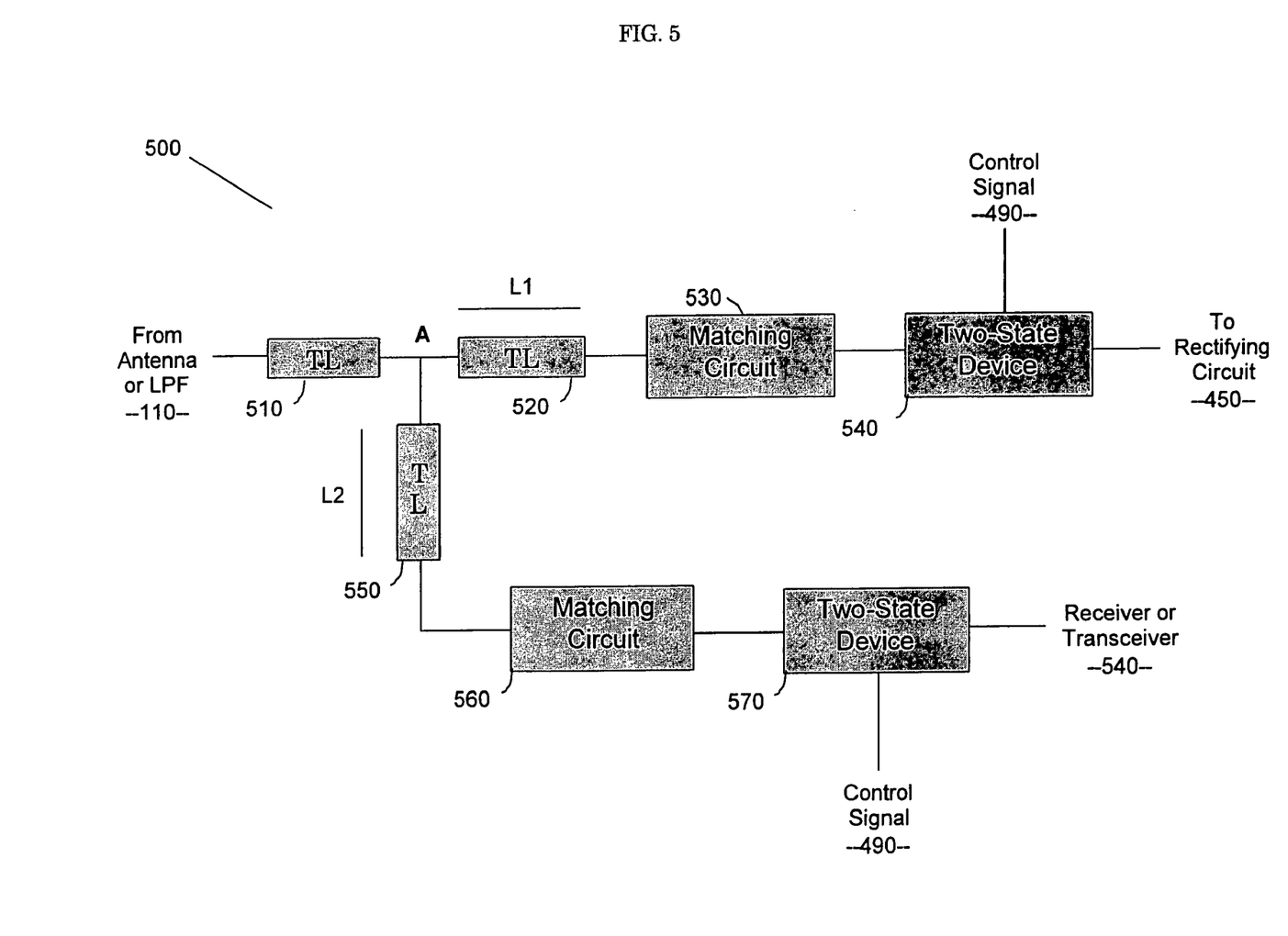
FIG. 5 is a schematic diagram for a switch of the receiving circuit of FIG. 4, according to one embodiment.

FIG. 5 is a more detailed diagram of one embodiment of the switching circuit 430 of FIG. 4. In this embodiment, incoming signal 110 enters the switch circuit 500 via transmission line (TL) 510. Depending on the impendence along TL 520 and TL 550, after reaching Point A, the signal 110 may travel along either TL 520 or TL 550. In one embodiment, two-state devices 540 and 570 are devices that can have two input impedance states (e.g., matched and reflective, open and closed, etc.). Such devices may include FETs, diodes, transistors, etc. When receiver 440 is in the low power consumption mode, the impedance for device 570 may be set to 'open' or 'reflective' using switch control signal 490. In this case, the signal 110 coming from Point A through TL 550 would be reflected back to Point A. Moreover, by choosing an appropriate length L2 for TL 550, the impendence looking from Point A into TL 550 would appear open. Similarly, using switch control signal 490, device 540 can be set to matched (or closed), allowing the signal 110 to move from Point A through TL 520 and through to the rectifying circuit 450. In one embodiment, matching circuits 540 and 570 may be used to match the impedance between the transmission lines (TL 520 and TL 550) and the two-state devices (devices 540 and 570). This is due to the fact that, even when the two-state devices are matched, the impedance of the two-state devices are not necessarily matched to the transmission line impedance.

In contrast, when the receiver 440 is in the active mode, the impedance for device 570 may be set to closed or matched. In this case, the signal from Point A will flow through along TL 550, through device 570 and into receiver 440. In one embodiment, device 570 is an FET and signal 110 is magnified before being passed to the receiver 440. In this case, the impedance for device 540, on the other hand, may be set to reflective (or open). Thus, by selecting the right length L1 for TL 520, the impedance looking from Point A into TL 520 can appear to be an open circuit, and the incoming signal 110 will pass through TL 550 and into the receiver 440.

Figure 6:
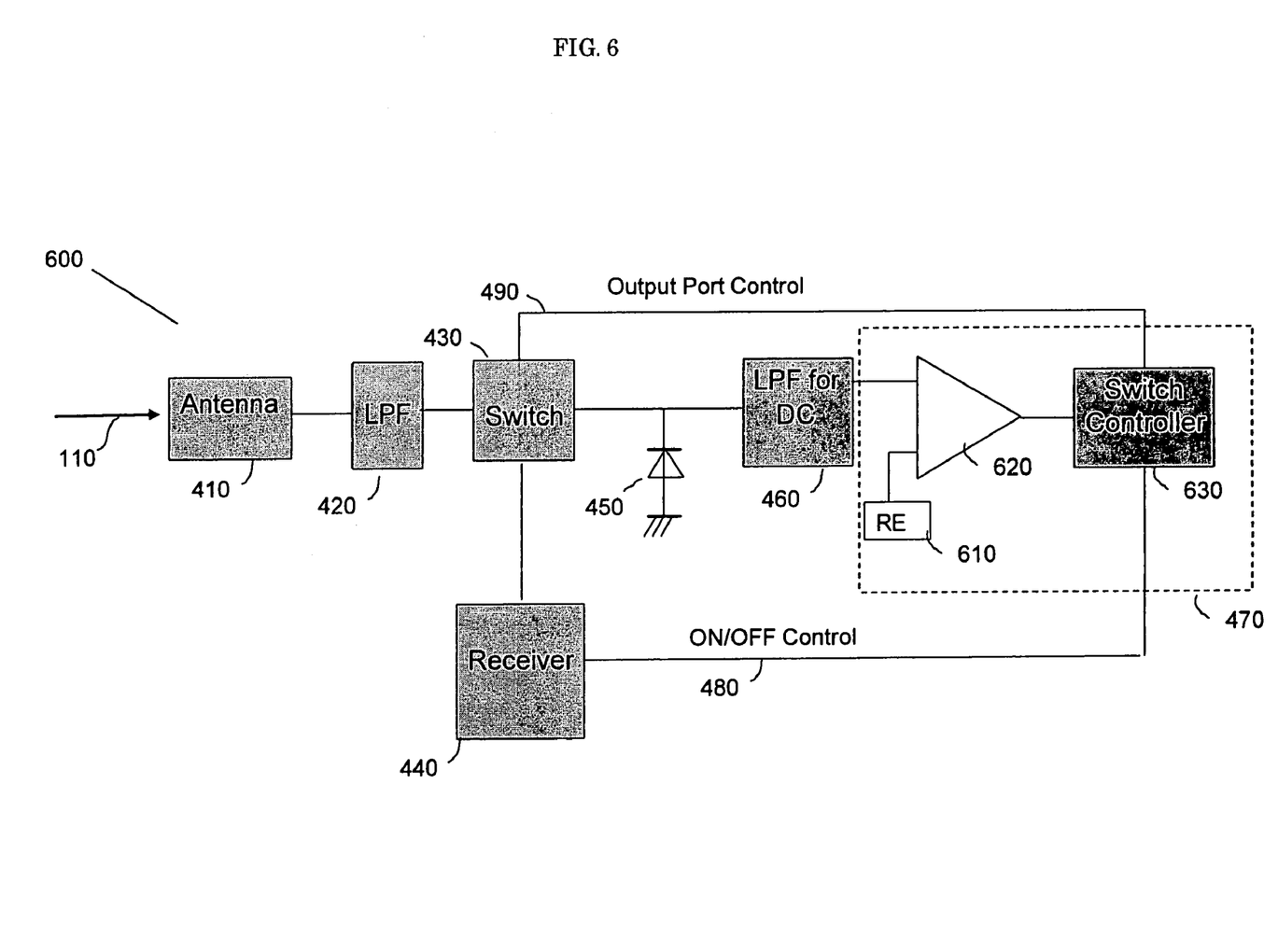
FIG. 6 is a schematic diagram of another embodiment of the receiving circuit of FIG. 4.

FIG. 6 depicts another embodiment of the receiving circuit 400 of FIG. 4. In this embodiment, DC detector 470 is comprised of a reference voltage source 610, comparator 620 and switch controller 630. In one embodiment, comparator 620 compares the voltage from reference voltage source 610 with the voltage passed by LPF 460. If the magnitude of the DC voltage received from the LPF 460 is greater than the reference voltage, the switch controller 630 may switch the output port of switching circuit 430 from the rectifying circuit 450 to the receiver 440. In one embodiment, this is done by using switch control signal 490. In another embodiment, the switch controller 630 may also turn on receiver 440 using On/OFF control signal 480. In yet another embodiment, the receiving circuit 400 may be a transceiver. In such a case, the communication between the switching circuit 430 and the receiver 440 will be bi-directional.

Figure 7:
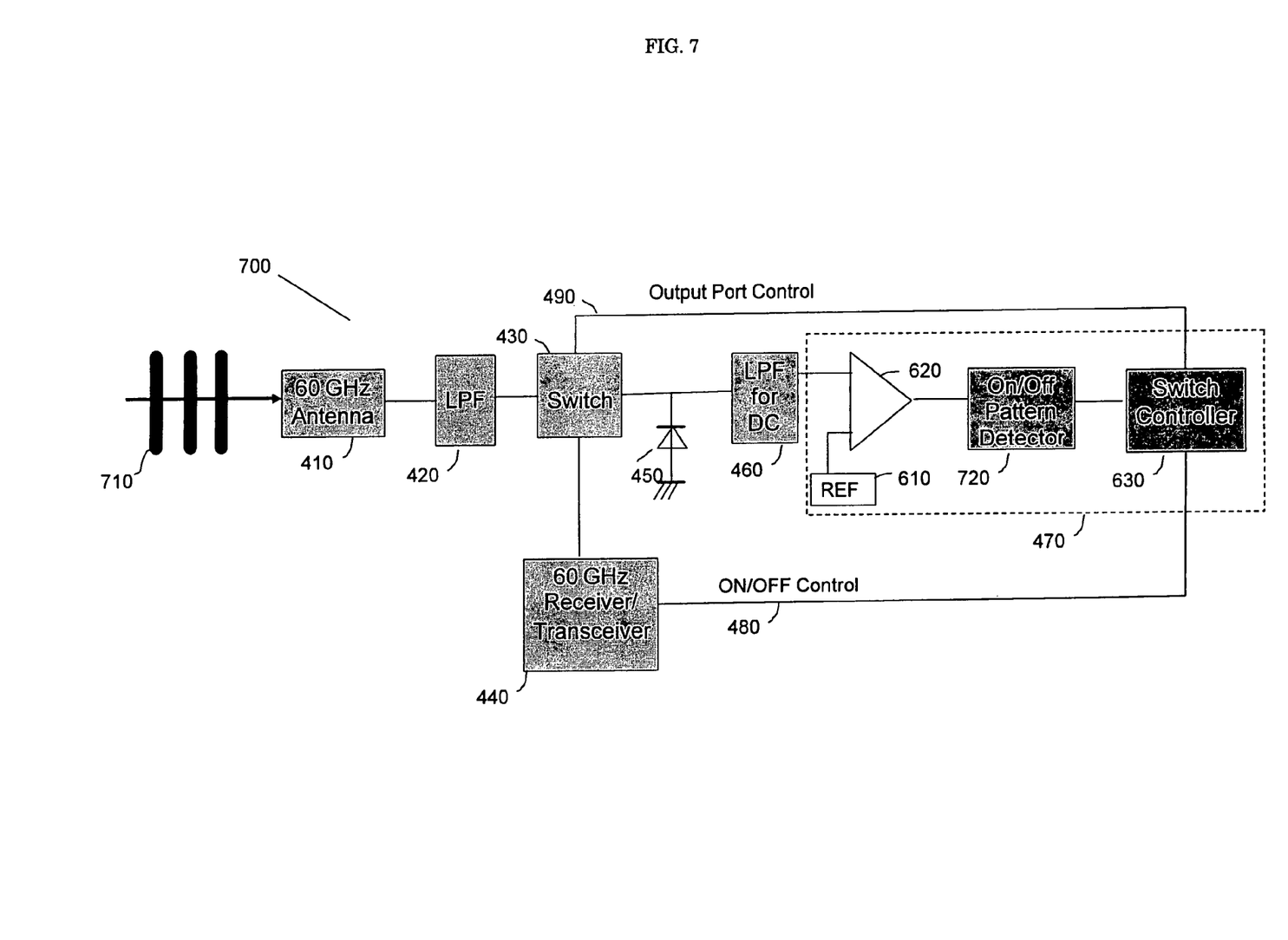
FIG. 7 is a schematic diagram of yet another embodiment of the receiving circuit of FIG. 4.

FIG. 7 is another embodiment of the receiving circuit 400 of FIG. 4 in which the incoming signal is a 60 GHz signal and is encoded with an on/off pattern 710. In this embodiment, the DC detection circuit 470 of receiving circuit 700 includes reference voltage source 610, comparator 620, switch controller 630 and on/off pattern detector 720. With such an arrangement, a specific on/off pattern can be used to activate or "wake up" a receiver which is in a low power consumption mode. Moreover, the on/off pattern can be transmitter specific, thereby allowing the receiving circuit 700 to remain in the low power consumption mode unless a predetermined transmitter is detected. Thus, multiple receiving devices with the same frequencies can be operated in close proximity without interfering with the operation modes (e.g., stand-by, active, etc.) of each other.

While the preceding description has been directed to particular embodiments, it is understood that those skilled in the art may conceive modifications and/or variations to the specific embodiments described herein. Any such modifications or variations which fall within the purview of this description are intended to be included herein as well. It is understood that the description herein is intended to be illustrative only and is not intended to limit the scope of the invention.

What is claimed is:

1. A communication system comprising:
   a plurality of wireless devices located in proximity to each other, each of said plurality of wireless device operating at substantially the same radio frequency, each of said plurality of wireless devices including,
   a receiver for receiving a radio frequency (RF) signal transmitted by one of said plurality of wireless devices along a line-of-sight of said receiver,
   a transmitter for transmitting said RF signal to one of said plurality of wireless devices along said line-of-sight, and
   wherein said RF signal is a substantially directional point-to-point signal having a frequency of at least 20 GHz, and further wherein, upon receiving said RF signal, a receiving wireless device of said plurality of wireless devices performs a compatibility check to determine if said receiving device operates at a frequency substantially equal to that of the RF signal.

2. The communication system of claim 1, wherein each of said plurality of wireless devices is to receive and transmit RF signals along one or more crossing paths.

3. The communication system of claim 1, wherein said RF signal has a range of approximately 2 meters.

4. The communication system of claim 1, wherein, after performing said compatibility check, an authorization check is performed to determine if said receiving device is authorized to receive said RF signal.

5. A method of communicating comprising:
   locating a plurality of wireless devices in proximity to each other, wherein each of said plurality of wireless device operate at substantially the same radio frequency;

transmitting a radio frequency (RF) signal to one of said plurality of wireless devices along a line-of-sight;

receiving said RF signal along said line-of-sight of said receiver, wherein said RF signal is a substantially directional point-to-point signal having a frequency of at least 20 GHz; and performing, after receiving said RF signal, a compatibility check to determine if a receiving device of said plurality of wireless devices operates at a frequency substantially equal to that of the RF signal.

6. The method of claim 5, further comprising transmitting RF signals, by said plurality of wireless devices, along one or more crossing paths.

7. The method of claim 5, wherein said RF signal has a range of approximately 2 meters.

8. The method of claim 5, wherein, after performing said compatibility check, the method further comprises performing an authorization check to determine if said receiving device is authorized to receive said RF signal.

* * * * *